United States Patent
Bikson et al.

(10) Patent No.: US 6,776,820 B2
(45) Date of Patent: Aug. 17, 2004

(54) INTEGRAL HOLLOW FIBER MEMBRANE GAS DRYER AND FILTRATION DEVICE

(75) Inventors: Benjamin Bikson, Brookline, MA (US); Scott Andrew Bartholomew, Worcester, MA (US); Salvatore Giglia, Norwood, MA (US); Bradley Quinn Johnson, Lakeville, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/900,881

(22) Filed: Jul. 10, 2001

(65) Prior Publication Data

US 2003/0010205 A1 Jan. 16, 2003

(51) Int. Cl.[7] .................. B01D 53/22; B01D 53/26; B01D 63/02
(52) U.S. Cl. .................. 95/52; 95/273; 96/8
(58) Field of Search .................. 95/45, 47–56, 95/4, 7–10

(56) References Cited

U.S. PATENT DOCUMENTS

| | | | | |
|---|---|---|---|---|
| 3,499,062 A | | 3/1970 | Geary, Jr. et al. | 264/36 |
| 3,735,558 A | | 5/1973 | Skarstrom et al. | 55/16 |
| 3,735,559 A | * | 5/1973 | Salemme | 95/52 |
| 4,497,640 A | * | 2/1985 | Fournie et al. | 96/8 X |
| 4,636,307 A | * | 1/1987 | Inoue et al. | 96/8 X |
| 4,670,145 A | * | 6/1987 | Edwards | 96/8 X |
| 4,687,578 A | * | 8/1987 | Stookey | 210/321.1 |
| 4,783,201 A | * | 11/1988 | Rice et al. | 95/52 |
| 4,940,617 A | | 7/1990 | Baurmeister | 428/36.3 |
| 5,026,479 A | | 6/1991 | Bikson et al. | 210/321.8 |
| 5,108,464 A | | 4/1992 | Friesen et al. | 55/16 |
| 5,160,514 A | * | 11/1992 | Newbold et al. | 95/52 X |
| 5,236,665 A | | 8/1993 | Mathewson et al. | 422/46 |
| 5,411,662 A | | 5/1995 | Nicolas, Jr. et al. | 210/321.8 |
| 5,525,143 A | | 6/1996 | Morgan et al. | 95/52 |
| 5,605,564 A | * | 2/1997 | Collins | 95/52 |
| 5,702,601 A | | 12/1997 | Bikson et al. | 210/321.79 |
| 5,800,597 A | * | 9/1998 | Perrotta et al. | 96/9 |
| 5,837,033 A | | 11/1998 | Giglia et al. | 95/45 |
| 5,897,729 A | | 4/1999 | Bikson et al. | 156/172 |
| 6,004,383 A | * | 12/1999 | Kuhnelt | 95/52 X |
| 6,019,822 A | | 2/2000 | Kanzawa et al. | 96/8 |
| 6,126,724 A | | 10/2000 | Martin et al. | 96/4 |
| 6,136,073 A | * | 10/2000 | Coan et al. | 96/8 |

FOREIGN PATENT DOCUMENTS

| | | | | |
|---|---|---|---|---|
| EP | 0601196 A1 | | 6/1994 | |
| JP | 63-258620 A | * | 10/1988 | 96/8 |
| JP | 03-186315 A | * | 8/1991 | 96/8 |
| JP | 05-137922 A | * | 6/1993 | 96/8 |
| JP | 06-134244 A | * | 5/1994 | 96/8 |
| JP | 06-134245 A | * | 5/1994 | 96/8 |
| JP | 06134246 A | * | 5/1994 | 96/8 |

* cited by examiner

Primary Examiner—Robert H. Spitzer
(74) Attorney, Agent, or Firm—David M. Rosenblum (57) ABSTRACT

An integral hollow fiber membrane gas purification apparatus is disclosed. The apparatus comprises one or more filtration elements and a hollow fiber membrane cartridge placed coaxially in a common housing. In some embodiments, the filtration elements are omitted and the hollow fiber membrane cartridge is employed as a combined gas separation/filtration device. The apparatus of this invention is particularly useful for conditioning compressed air that includes the removal of both suspended matter and water vapor.

34 Claims, 3 Drawing Sheets

INTEGRAL HOLLOW FIBER MEMBRANE GAS DRYER AND FILTRATION DEVICE

FIELD OF THE INVENTION

The invention relates to a process and apparatus for purifying and conditioning water vapor containing gas streams. The integral hollow fiber membrane gas dryer and filtration device of this invention is particularly useful in removing suspended matter and dehydrating compressed air streams.

BACKGROUND OF THE INVENTION

Various hollow fiber membrane devices have been used to remove moisture from water vapor containing gas streams. The water vapor containing gas stream is brought into contact with one side of a permeable membrane with a pressure differential being maintained across the membrane, wherein the highly permeable water vapor will permeate the membrane to the second side thereof, and a dry nonpermeate gas is recovered.

It has been known in the art that hollow fiber membrane gas dehydration devices can function more efficiently under some process conditions when a small portion of the dried product gas, i.e., the nonpermeate gas, is recycled as a sweep gas to the permeate side of the membrane. The use of the dry sweep can improve the product gas dryness and/or the productivity of the membrane device. The separation assembly that provides for sweep or purge gas utilization is generally comprised of an annular hollow fiber membrane bundle in an enclosure or shell having a fluid feed inlet, a nonpermeate outlet, a permeate outlet and a sweep gas inlet. Examples of such membrane assemblies can be found in U.S. Pat. Nos. 3,499,062; 3,735,558; 4,718,921; 5,108,464 and 5,026,479. These devices, however, require the use of external plumbing and valves to regulate the flow of the sweep gas that is fed into the sweep gas inlet port. The need to manifold the dry sweep gas externally to the gas separation apparatus adds to the size and complexity of the device. Several attempts have been made to provide a gas dehydration device with an integral internal sweep arrangement, as disclosed in U.S. Pat. Nos. 5,411,662 and 5,525,143.

The membrane gas dehydration devices are usually utilized as a part of an overall gas conditioning system and are thus frequently used in conjunction with filters, coalescers and cyclone separators that are designed to remove suspended matter, particles, and oil and water droplets from the gas stream. These filters and coalescers are typically employed in front of the membrane gas dehydrators, thereby serving to protect membranes against fouling and extending the life of the membrane device. Attempts have been made to integrate these gas-conditioning devices into a single apparatus. An apparatus for air dehumidification that combines a membrane dehydration element with a cyclone separator and a sequence of filters is disclosed in U.S. Pat. No. 6,019,822. However, the apparatus is complex; the filters and the membrane gas dehydration element are disposed so that the longitudinal axis of these elements is parallel to each other. The resulting apparatus is essentially a fusion of conventional sequential filtration elements and a membrane dehydration element packaged into a complicated assembly with little or no associated cost reduction. Thus there still remains a need in the art for an improved gas-conditioning device that simultaneously removes suspended matter and dehydrates the gas.

OBJECTS OF THE INVENTION

It is therefore an object of this invention to provide an integral hollow fiber membrane dehydration and filtration device packaged into a casing.

It is another object of this invention to provide an improved process for purifying compressed gas stream by removing suspended matter, such as one or more of oil, water droplets, dust or water vapor with an integral filtration/membrane dehydration apparatus.

SUMMARY OF THE INVENTION

According to one preferred embodiment of the present invention, the above objectives and other objectives that are apparent to those skilled in the art may be achieved by a gas purification apparatus comprising:

(i) a housing body defined by a bowl or shell connected in a sealed and removable manner in correspondence with its axial end portion to a head closure member, wherein said head closure member having formed therethrough a feed gas inlet port in a first end of said head closure member and an outlet product port in a second end of said head closure member and a gas flow conduit positioned coaxially to said housing body such that said inlet port and said outlet port are spaced essentially in a straight line relative to one another and said gas flow conduit is placed in fluid communication with said outlet port, and wherein said bowl or shell being provided with at least one waste fluid exit port placed coaxially to said housing body, (ii) a gas filtration element disposed coaxially in said housing body in fluid communication with said feed gas inlet port, and (iii) a hollow fiber membrane gas separation cartridge (which is preferably substantially cylindrical) disposed coaxially in said housing body downstream of said filtration element and connected in a sealed and removable manner with its first axial end to said gas flow conduit in the head closure member and with its second axial end to said waste fluid exit port in said bowl or shell.

A more preferred hollow fiber membrane cartridge includes:

a) an elongated tubular inner core member, b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side, c) two tubular tubesheets encapsulating both ends of the hollow fiber bundle in a fluid-tight arrangement with one end of the inner core member opening out of one of the tubesheets to permit flow of gas in and out of said inner core member and wherein at least one of said tubesheets is severed to permit an unobstructed flow of gas in and out of the hollow fiber lumens; and, d) a shell and at least one end closure surrounding said hollow fiber membrane bundle.

Preferably the cartridge is further provided with a flow-control orifice that channels a fraction of the nonpermeate gas as a sweep to the permeate side of the hollow fiber membranes.

According to another preferred embodiment of this invention, the above objectives and other objectives that are apparent to those skilled in the art are achieved by providing a gas purification apparatus comprising:

a) a housing body defined by first and second essentially cylindrical bowls or shells connected in a sealed and removable manner in correspondence to their axial end portion to a common head closure member being interposed therebetween, said first and second bowls or shells defining a lower internal chamber and upper internal chamber within said housing, wherein said head closure having formed therethrough a feed gas inlet port in a first end of said head closure and a product outlet port in a second end of said head closure, such that said inlet port and said outlet port are spaced essentially in a straight line, and at least one gas transport conduit in fluid communication with said upper and lower internal chambers and wherein said first bowl or shell and said second bowl or shell being provided with at least one waste fluid exit port, b) a gas filtration element adapted to separate liquid and solid particles from incoming gas passing therethrough disposed in said lower chamber, and c) a substantially cylindrical hollow fiber membrane cartridge adapted to separate water vapor from incoming gas passing therethrough disposed in said upper chamber.

Wherein said filtration element and said hollow fiber membrane cartridge are disposed around a common longitudinal axis within said housing body, said axis being essentially concentric to said housing body.

According to another preferred embodiment of the present invention, the above objectives and other objectives that are apparent to those skilled in the art are achieved by providing a gas purification process comprising:

a) passing a feed gas stream containing water vapor through at least one filtration element adapted to separate liquid and particulates from said incoming feed gas passing therethrough, b) contacting the filtered feed gas with a multiplicity of hollow fiber membranes contained in a cartridge, c) permeating a portion of the water vapor contained in the feed gas stream through the membranes, d) utilizing a portion of a resultant nonpermeate dehydrated gas stream internally of the cartridge to provide a sweep gas to the permeate side of the hollow fiber membranes substantially countercurrent to the flow of the feed gas, e) recovering the main remaining nonpermeate dehydrated and filtered gas stream, and wherein said filtration element and said hollow fiber membrane cartridge are disposed around a common longitudinal axis and are enclosed in a common, essentially cylindrical casing. According to another embodiment of the present invention, the above objectives and other objectives that are apparent to those skilled in the art are achieved by providing a gas purification process comprising:

a) contacting a feed gas with a multiplicity of hollow fiber membranes contained in a cartridge, b) permeating a portion of the water vapor contained in the feed gas stream through the membranes while simultaneously removing suspended matter contained in said feed gas; and c) recovering the main remaining nonpermeate dehydrated and filtered gas stream.

A portion of a resultant nonpermeate dehydrated gas stream may be used internally of the cartridge to provide a sweep gas to the permeate side of the hollow fiber membranes substantially countercurrent to the flow of the feed gas stream.

BRIEF DESCRIPTION OF DRAWINGS

Other objects, features and advantages will occur to those skilled in the art from the following description of (a) preferred embodiment(s) and the accompanying drawing(s), in which.

DETAILED DESCRIPTION OF THE INVENTION

This invention provides for gas purification processes that utilize the disclosed novel integral membrane gas dehydration/filtration apparatus. The gas purification processes of this invention are designed to remove suspended matter from gas, including, but not limited to oil, water droplets, dust, and/or water vapor through the use of a singular integral device. In a preferred embodiment, the device comprises at least one gas filtration element and a hollow fiber membrane gas dehydration cartridge placed coaxially in a common, substantially cylindrical housing. The filtration element can partially or completely surround the membrane cartridge; alternatively it can be placed internal to the membrane cartridge or, in yet another alternative it can be placed below the membrane cartridge in a coaxial arrangement. In some embodiments, the gas filtration element is omitted and a single gas filtration/gas separation hollow fiber membrane cartridge is utilized. Furthermore, in some instances a cyclone separator or deflector is disposed in front of the filtration element to aid in the removal of oil and water droplets. In some embodiments, the filtration element and the membrane cartridge are placed coaxially around a central tubular core member that can be a common core member wherein the filtration element and the membrane cartridge abut each other. The filtration element and the hollow fiber membrane cartridge are preferably removably attached. Accordingly it is not necessary to carry out time consuming disassembly of the clogged filter element into the component parts. Rather, the casing of the gas purification assembly of this invention can be easily opened to detach the clogged filtration element for replacement purposes. The gas filtration element is typically positioned upstream of the membrane dehydration element so that the life of the membrane dehydration element can be extended. However, in some embodiments, a particulate filter can be also placed downstream of the membrane cartridge as a polishing filter.

The membrane gas separation/dehydration element may be constructed of permeable hollow fiber membranes. The hollow fiber membranes can be dense wall, composite, or asymmetric in structure. The composite and the asymmetric hollow fiber configurations are the preferred configurations, with the composite configuration being the most preferred. The chemical composition and the structure of gas dehydration membranes are well known in the art and examples of such membranes are disclosed in U.S. Pat. Nos. 4,497, 640; 4,687,578; 4,783,201; 4,718,921; 5,026,479 and 5,108, 464. It is advantageous that the dehydration membrane exhibits high water permeance combined with high separation factor between the water vapor and product components of the conditioned gas. For example, in air purification applications, the $H_2O/O_2$ separation factor of the dehydration membrane of this invention is frequently above 500 and preferably above 2000, and most preferably above 5000. The high $H_2O/O_2$ separation factor is particularly important in compressed air dehydration since it provides for efficient dehydration without substantial change in oxygen concentration of the dried air stream.

In some gas purification applications, it is desirable to remove not only the water vapor, but also at least one additional gaseous component from the feed gas stream. Non-limiting examples of such gas separation processes include the generation of dry nitrogen-enriched air and the removal of acid gases, such as carbon dioxide, from a high-pressure gas stream. In such gas purification applications, the membrane should preferably exhibit a high gas permeance, not only to water vapor but also to other gaseous components to be removed from the purified product gas by permeation, such as oxygen and carbon dioxide.

Membrane selection criteria, i.e., the selection of a membrane that exhibits a desirable combination of gas separation/permeation characteristics for the specific gas purification application are well known to those skilled in the art. Furthermore, it will also be known to those skilled in the art to select a membrane gas permeation process with or without the use of the purge gas on the permeate side of the membrane as particularly advantageous for the specific gas separation application.

The hollow fiber membrane element of this invention can be constructed to employ shell side feed or bore side, (i.e., lumen side), feed arrangements in a countercurrent-feed-to-permeate-flow configuration or cross-flow feed-to-permeate flow configuration, or a configuration comprising a combination of the countercurrent and cross-flow flow configurations. However, the shell side feed configuration is preferred. It was found that the life of the membrane element can be substantially extended by deploying the composite or the asymmetric membrane such that the feed gas is brought into contact with the dense separation layer of the membrane, and the permeate gas is withdrawn through the porous support. This is contrary to the prevailing commercial practice of compressed air dehydration wherein the lumen side feed configuration is employed. It was found surprisingly that when a shell side feed configuration is employed wherein the feed gas is brought into contact with the dense separation layer side of the membrane, the hollow fiber membrane element can be used not only to dry gas but also simultaneously as a gas filter/coalescer.

The filtration element and the material of its manufacture are selected to meet a specific purification need. Gas contaminants may include solid particulates, oil aerosols and vapor, water aerosols and vapor, or unwanted gases. Solid particulates may include dirt and pollen particulates that will typically range from 0.01 to 20 microns in size; and liquid aerosols include oil and water droplets that will typically range from 0.01 to 10 microns in size. The filter selection will depend on the specific filtration application. The filtration media grade is frequently provided to specify the level of filtration. The high efficiency filter elements are constructed with pleated cellulose paper, pleated gas fiber paper (high efficiency particulate HEPA), wrapped HEPA paper (for increased depth filtration), vacuum formed microglass HEPA medium, and various granular adsorbents for vapor phase contaminant removal. Wrapped HEPA paper media is widely used for particle removal and coalescing in the same element. The glass paper utilized to make wrapped filter elements is preferably impregnated with a chemical binder to increase the strength of the cylindrical element and to enhance filtration efficiency. The coalescing filters typically exhibit a graduated pore structure throughout the depth of the filter medium. The optimum filter element selection to remove a specific contaminant will be well known to those skilled in the art.

To further clarify the present invention, there will be described in detail preferred embodiments of gas purification devices according to the present invention by reference to the drawings.

Figures 1, 1A:
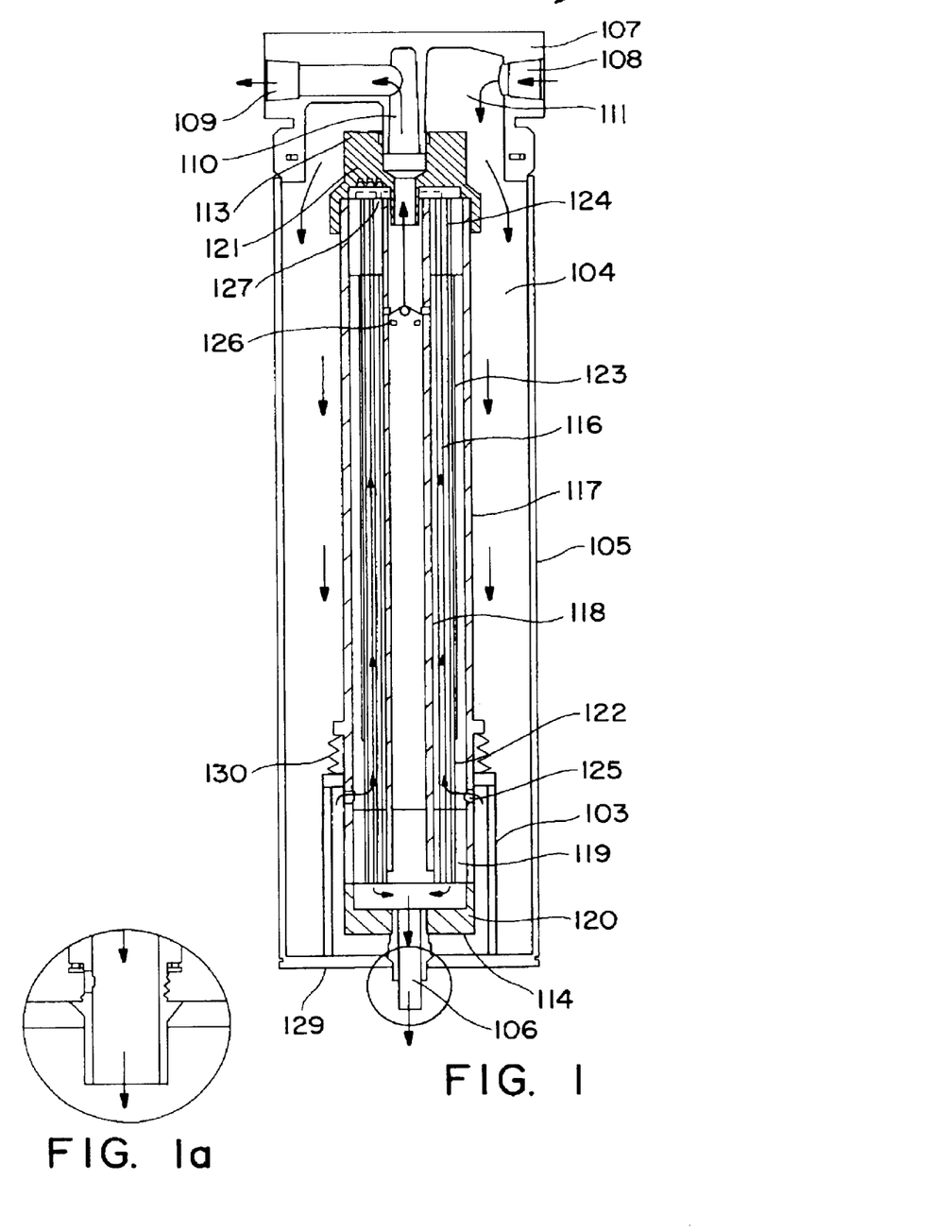
FIG. 1 is a sectional view of a gas purification apparatus according to one embodiment of this invention wherein a gas filtration element is disposed around a hollow fiber membrane cartridge.
FIG. 1a is an enlarged fragmented view of the waste fluid port shown in the open position.

Referring to FIG. 1 there is shown a sectional view of one embodiment of a gas purification apparatus according to this invention. The gas purification apparatus 101 comprises an outer housing body that comprises a bowl or shell body member 105 and a head closure member 107, a gas filtration element 103, and a hollow fiber membrane gas separation cartridge 104, both the filtration element and membrane cartridge are positioned within the housing body. The bowl or shell body is essentially cylindrical in shape and is connected in a sealed and removable manner to the head closure member 107. The head closure connects to the axial-end portion of the bowl or shell by threads or by a bayonet connector, as shown in FIG. 1, or by any other fluid-tight sealing arrangement. The head closure 107 contains a feed gas inlet port 108, a purified gas outlet port 109, and gas transfer conduits 110 and 111. The feed and product gas ports are formed in a first and second end of the head closure 107 and are spaced essentially in a straight line relative to one another. The gas transfer conduit 110 is positioned coaxially to the housing body. The gas transfer conduits 111 and 110 are in fluid communication with the feed and product ports, respectively.

The bowl or shell 105 contains a waste fluid drain port 106. In addition or in lieu of the manual drain arrangement shown in FIG. 1, an automatic drain arrangement that is well known in the art can be employed. In FIG. 1, the drain arrangement is shown in the closed position. FIG. 1a provides an enlarged fragmented view of the waste fluid port in the open position.

The filtration element 103 has essentially a cylindrical hollow shape; it is positioned coaxially to the housing body and partially surrounds the membrane cartridge 104. The filtration element is bordering with its first edge in a substantially sealed manner the exterior shell 105 of the membrane cartridge 104 and with its second edge the base wall 129 of the bowl member 105. The filtration element is secured against the base wall 129 through loading by the spring 130.

The hollow fiber membrane gas purification cartridge of this embodiment is positioned in the chamber formed by the exterior housing downstream of the filtration element. The cylindrical hollow fiber membrane cartridge is connected in a sealed and removable manner by its first terminal axial end 113 to the gas transfer conduit 110 in the head closure member 107 and with its second terminal axial end 114 to the waste gas outlet port 106 in the bowl or shell 105. The cartridge is attached to the port 106 by a threaded connection. The connections between the cartridge and the head closure and the cartridge and the bowl or shell are sealed with o-rings that provide a fluid-tight seal.

The hollow fiber membrane cartridge 104 comprises an annular hollow fiber membrane bundle 116 arranged around the hollow core tube member 118, surrounded by shell 117 and axial end closures or caps 120 and 121. The bundle 116 is formed by a multiplicity of hollow fiber membranes uniformly arranged around the tubular member 118. One preferred method of forming a uniformly structured hollow fiber bundle is by winding the hollow fibers around the tubular member 118. Both ends of the hollow fiber membrane bundle 116 are encapsulated in tubesheets 119 and 124 in a fluid-tight arrangement with one end of the inner core tube member 118 opening out of the tubesheet 124. The tubesheet ends are severed to allow for unobstructed gas flow from and into the hollow fiber lumens. The exposed hollow fiber membrane bundle between the tubesheets 119 and 124 may be encased, as shown in FIG. 1, with an essentially nonpermeable film barrier or a wrap 123 except for a non-encased circumferential region or gap 122 adjacent to the tubesheet 119. The wrap 123 is designed to improve the uniformity of gas flow through the bundle and to ease its installation into the external shell 117. The gas flow passageways in the membrane cartridge 104 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into the hollow fiber bundle 116 through openings 125 in the shell 117 and the gap 122 and the nonpermeate product gas is removed through openings 126 in the core tube member 118. The openings 125 and 126 are positioned adjacent to the tubesheets 119 and 124, respectively. The permeate gas is withdrawn through the open ends of the hollow fiber lumens on the axial surface of the tubesheet 119. This flow arrangement ensures a substantially countercurrent flow of the feed gas with respect to the permeate gas. The cartridge 104 is further equipped with a flow-control orifice 127 that provides for introduction of a fraction of the nonpermeate gas as a sweep. The placement of the orifice 127 can be located inside or outside the tubesheet, furthermore, it can be omitted from the embodiments that do not require the use of the sweep gas internal to the cartridge.

In the gas purification/separation process of this invention the feed gas is introduced into the apparatus 101 through the feed port 108 that connects to the hollow gas transport conduit 111. The gas is transported through the filtration media of the filtration element 103 wherein the suspended matter is removed. The feed gas is channeled through openings 125 into the shell side of the hollow fiber membrane bundle 116 wherein the feed gas is brought into contact with the exterior of hollow fiber membranes. The feed gas stripped of undesirable gaseous impurities, such as water vapor, that were removed by permeation into the hollow fiber lumens is then transported through openings 126 into the tubular core member 118 and then through the gas transfer conduit 110 into the product exit port 109. A fraction of the nonpermeate gas is directed through the orifice 127 into the hollow fiber lumens and is used as a sweep gas on the permeate side of the hollow fibers. The combined permeate/flow stream is removed from the apparatus as a waste gas through the port 106. The liquid removed by the filtration element 103 is collected at the bottom of the bowl or shell 105 and is removed through the waste fluid port 106 intermittently. The orifice 127 is an interchangeable flow-control orifice that is sized to allow a predetermined amount of nonpermeate gas to be used as a sweep. The amount of sweep gas in turn determines the level of product purity. The sweep gas flow rate is frequently 5% to about 30% of the net flow rate of the nonpermeate gas. An advantageous feature of the cartridge is that the same cartridge can be used to generate different purity products by simply changing the size of the orifice.

The apparatus shown in FIG. 1 utilizes a hollow fiber membrane cartridge wherein the feed gas is introduced external to the cartridge and the nonpermeate gas is withdrawn internal to the cartridge.

Figures 2, 2A:
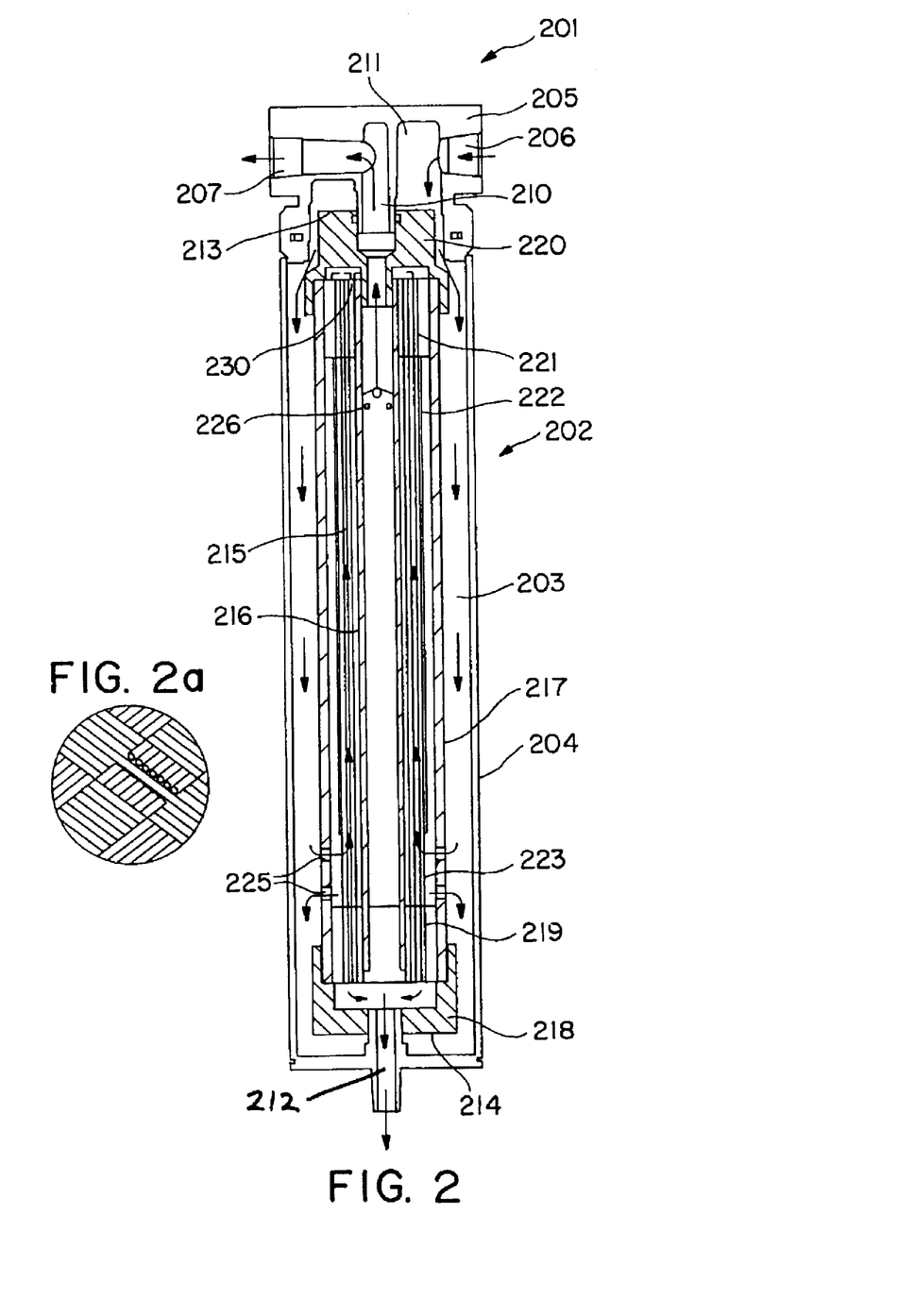
FIG. 2 is a sectional view of a gas purification apparatus according to another embodiment of this invention wherein the hollow fiber membrane cartridge is utilized to conduct a combined filtration/dehydration operation.
FIG. 2a is an enlarged fragmented view of the wound hollow fiber bundle.

Referring to FIG. 2 there is shown a sectional view of another embodiment of a gas purification apparatus according to this invention. The gas purification apparatus 201 comprises an outer housing body 202 comprising a bowl or shell body member 204 and a head closure member 205, and a hollow fiber membrane gas separation cartridge 203, the membrane cartridge is positioned within the housing body. The housing body includes a bowl or shell body member 204 and a head closure member 205. The bowl or shell body is essentially cylindrical in shape and is connected in a sealed and removable manner to the head closure member 205. The head closure connects to the axial-end portion of the bowl or shell by threads or by a bayonet connector, as shown in FIG. 2, or by any other fluid-tight sealing arrangement. The head closure 205 contains a feed gas inlet port 206, a purified gas outlet port 207, and gas transfer conduits 210 and 211. The feed and product gas ports are formed in a first and second end of the head closure 205 and are spaced essentially in a straight line relative to one another. The gas transfer conduit 210 is positioned coaxially to the housing body. The gas transfer conduits 210 and 211 are in fluid communication with the feed and product ports, respectively.

The bowl or shell 204 contains a waste fluid drain port 212. The drain is shown in the closed position. In addition or in lieu of the manual drain arrangement 212, an automatic drain arrangement that is well known in the art can be employed.

The hollow fiber membrane gas purification cartridge of this invention is positioned in the chamber formed by the exterior housing. The cylindrical hollow fiber membrane cartridge is connected in a sealed and removable manner by its first terminal axial end 213 to the gas transfer conduit 210 in the head closure member 205 and with its second terminal axial end 214 to the waste fluid outlet port 212 in the bowl or shell 204. The cartridge is attached to the bowl or shell 204 by a threaded connection. The connections between the cartridge and the head closure and the cartridge and the bowl or shell are sealed with o-rings that provide a fluid-tight seal.

The hollow fiber membrane cartridge 203 comprises an annular hollow fiber membrane bundle 215 arranged around the hollow core tube member 216, surrounded by shell 217 and axial end closures or caps 218 and 220. The bundle 215 is formed by a multiplicity of hollow fiber membranes uniformly arranged around the tubular member 216. To improve the filtration efficiency, the hollow fiber bundle should be structurally packed to provide uniform cross-sectional fiber density. The methods of constructing structured hollow fiber bundles with predetermined inter-fiber spacing are well known in the art. Preparation of hollow fiber bundles with controlled fiber packing is disclosed, for example, in U.S. Pat. Nos. 4,940,617; 5,236,665; 5,702,601; 5,837,033 and 5,897,729. One preferred method of forming a uniformly structured hollow fiber bundle is by helically winding hollow fibers around the tubular member 216. An enlarged fragmented view of the wound hollow fiber bundle is shown in FIG. 2a. The filtration efficiency and the coalescing action of the hollow fiber bundle can be frequently enhanced by winding monofilaments concurrently with the hollow fibers. The monofilaments can be wound at a substantially different wind angle as the wind angle of the hollow fibers. Furthermore, the filament packing density can be varied along the axial length of the bundle. Examples of such co-winding procedures are provided in the above referenced U.S. Pat. Nos. 5,702,601 and 5,897,729. To enhance internal pore structure, the high efficiency filters are frequently constructed with a graduated pore (void) structure throughout the depth of the filter medium. There is more room for particulates to accumulate in the upstream layers of the fiber matrix, while the downstream layers enhance the coalescing removal efficiency. As a result, extended filter element life, high aerosol and particulate removal efficiency, and low differential pressure can be achieved simultaneously. The hollow fiber bundles of this invention can be constructed with graded packing density along the axial length of the bundle (along the gas flow path) while maintaining a uniform cross-sectional packing density.

This can be accomplished by co-winding monofilaments at a different packing density along the axial length of the bundle as described above and/or by varying the wind angle of the hollow fibers or monofilaments along the axial length of the bundle, or by a combination of the above methods and other methods well known in the art. The variable angle winding process is disclosed in the above referenced U.S. Pat. No. 5,837,033. Both ends of the hollow fiber membrane bundle 215 are encapsulated in tubesheets 219 and 221 in a fluid-tight arrangement with one end of the inner core tube member 216 opening out of the tubesheet 220. The tubesheet ends are severed to allow for unobstructed gas flow from and into the hollow fiber lumens. The exposed hollow fiber membrane bundle between the tubesheets 219 and 221 may be encased, as shown in FIG. 2, with an essentially nonpermeable film barrier or a wrap 222 except for a non-encased circumferential region or gap 223 adjacent to the tubesheet 219. The wrap 223 is designed to improve uniformity of gas flow through the bundle and to ease its installation into the external shell 217. The gas flow passageways in the membrane cartridge 203 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into the hollow fiber bundle 216 through openings 225 in the shell 217 and the nonpermeate product gas is removed through openings 226 in the tubular core member 216. The openings 225 and 226 are positioned adjacent to the tubesheet 219 and 221, respectively. The lower row of openings 225 is also utilized to remove entrained liquids from the cartridge 203. The permeate gas is withdrawn through the open ends of the hollow fiber lumens on the axial surface of the tubesheet 219. This flow arrangement ensures a substantially countercurrent flow of the feed gas with respect to the permeate gas. The cartridge 203 is further equipped with a flow-control orifice 230 placed in the tubesheet 221 that provides for introduction of a fraction of the nonpermeate gas as a sweep. The placement of the orifice 230 can be inside or outside the tubesheet, furthermore it can be omitted from the embodiments that do not require the use of the sweep gas internal to the cartridge.

In the gas purification/separation process of this invention the feed gas is introduced into the apparatus 201 through the feed port 206 that connects to the gas transport conduit 211. The feed gas is channeled through openings 225 into the shell side of the hollow fiber membrane bundle 215 wherein the feed gas is brought into contact with the exterior of hollow fiber membranes. The feed gas is transported through the filtration media formed by the structured hollow fibers wherein the suspended matter is removed, while simultaneously the feed gas is stripped of undesirable gaseous impurities, such as water vapor, that were removed by permeation into the hollow fiber lumens. The purified gas is then transported through openings 226 in the tubular core member into the gas transfer conduit 220 and is then collected as a product nonpermeate gas through the exit port 207. A fraction of the nonpermeate gas is directed through the orifice 230 into the hollow fiber lumens and is used as a sweep gas on the permeate side of the hollow fibers. The combined permeate/flow stream is removed from the apparatus as a waste gas through the port 212. The liquid removed by the filtration action of the hollow fiber cartridge 203 is collected at the bottom of the bowl or shell 204 and is removed through the waste fluid port 212 intermittently. The orifice 230 is an interchangeable flow-control orifice that is sized to allow a predetermined amount of nonpermeate gas to be used as a sweep. The amount of sweep gas in turn determines the level of product purity. The sweep gas flow rate is frequently 5% to about 30% of the net flow rate of the nonpermeate gas. The apparatus shown in FIG. 2 utilizes a hollow fiber membrane cartridge wherein the feed gas is introduced external to the cartridge and the nonpermeate gas is withdrawn internal to the cartridge.

Figure 3:
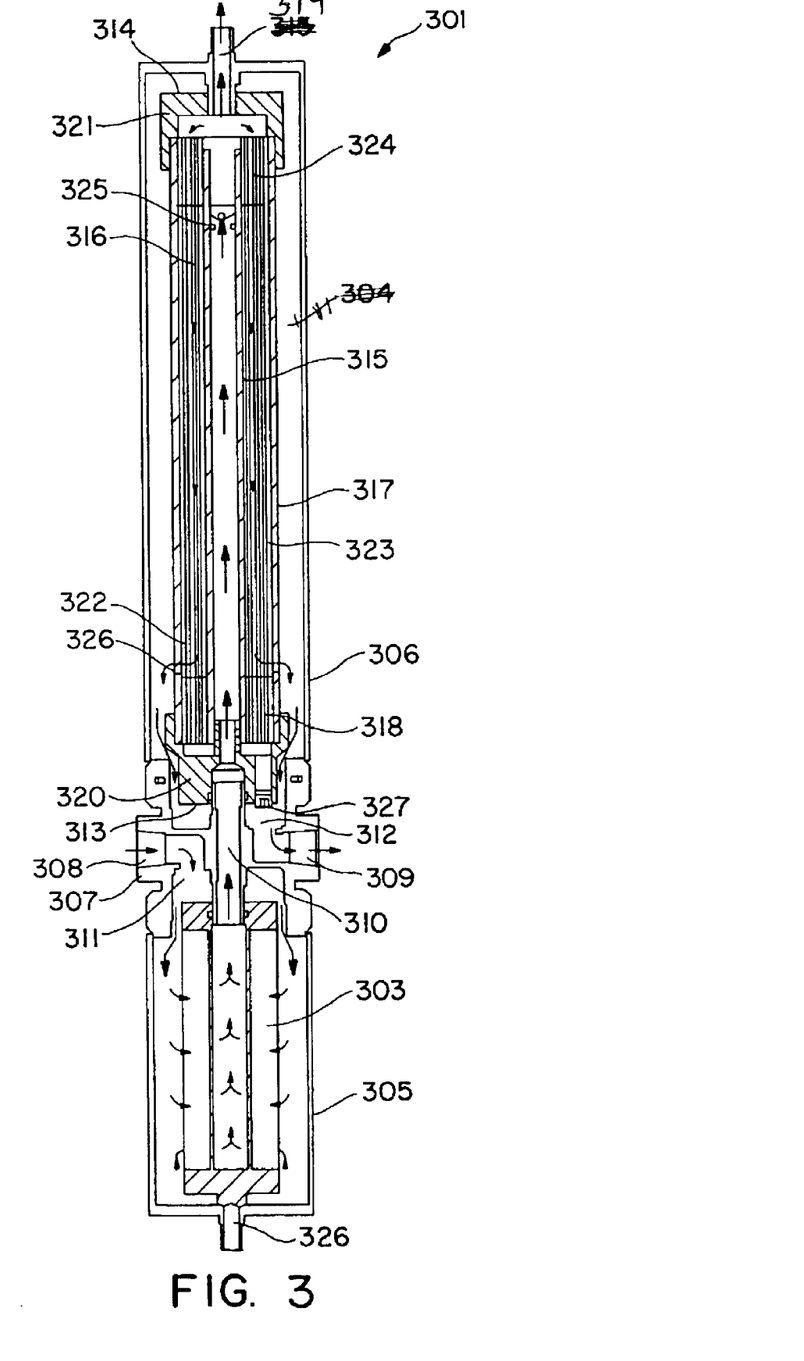
FIG. 3 is a sectional view of a gas purification apparatus according to another embodiment of this invention wherein the hollow fiber membrane cartridge is positioned coaxially to and above the gas filtration element.

Referring to FIG. 3 there is shown a sectional view of another embodiment of a gas purification apparatus according to this invention. The gas purification apparatus 301 comprises an outer housing body comprising a lower bowl/shell body member 305, an upper bowl/shell body member 306, and a head closure member 307 in the form of a partition interposed therebetween, a gas filtration element 303, and a hollow fiber membrane gas separation cartridge 304, both the filtration element and membrane cartridge are positioned within the housing body. The bowl or shell bodies are essentially cylindrical in shape and are connected in a sealed and removable manner to the head closure member 307. The head closure connects to the axial-end portion of the bowls or shells by threads or by a bayonet connector, as shown in FIG. 3, or by any other fluid-tight sealing arrangement. The head closure 307 contains a feed gas inlet port 308, a purified gas outlet port 309, and gas transfer conduits 310, 311 and 312. The feed and product gas ports are formed in a first and second end of the head closure 307 and are spaced essentially in a straight line relative to one another. The gas transfer conduit 310 is positioned coaxially to the housing body and provides a fluid communication channel between the upper and lower parts of the housing body. The gas transfer conduits 311 and 312 are in fluid communication with the feed and product ports, respectively.

The bowl or shell 305 contains a liquids waste drain port 326. The manually operated drain is shown in the closed position. In addition or in lieu of the manual drain arrangement 326, an automatic drain arrangement that is well known in the art can be employed. The bowl or shell 306 contains a waste gas exit port 315.

The hollow fiber membrane gas purification cartridge of this invention is positioned in the chamber formed by the exterior upper housing. The cylindrical hollow fiber membrane cartridge is connected in a sealed and removable manner by its first terminal axial end 313 to the gas transfer conduit 310 in the head closure member 307 and with its second terminal axial end 314 to the waste gas outlet port 315 in the bowl or shell 306. The cartridge is attached to the port 315 in the bowl or shell 306 by a threaded connection. The connections between the cartridge and the head closure and the cartridge and the bowl or shell are sealed with o-rings that provide a fluid-tight seal.

The hollow fiber membrane cartridge 304 comprises an annular hollow fiber membrane bundle 316 arranged around the hollow core tube member 315, surrounded by shell 317 and axial end closures or caps 320 and 321. The bundle 316 is formed by a multiplicity of hollow fiber membranes uniformly arranged around the tubular member 315. One preferred method of forming a uniformly structured hollow fiber bundle is by winding the hollow fibers around the tubular member 315. Both ends of the hollow fiber membrane bundle 316 are encapsulated in tubesheets 318 and 324 in a fluid-tight arrangement with one end of the inner core tube member 315 opening out of the tubesheet 318. The tubesheet ends are severed to allow for unobstructed gas flow from and into the hollow fiber lumens. The exposed hollow fiber membrane bundle between the tubesheets 318 and 324 may be encased, as shown in FIG. 3, with an essentially nonpermeable film barrier or a wrap 323 except for a non-encased circumferential region or gap 322 adjacent to the tubesheet 319. The wrap 323 is designed to improve uniformity of gas flow through the bundle and to ease its installation into the external shell 317. The gas flow passageways in the membrane cartridge 304 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into the hollow fiber bundle 316 through openings 325 in the tubular core member 315 and the nonpermeate product gas is removed through the gap 322 and openings 326 in the external shell 317. The openings 325 and 326 are positioned adjacent to the tubesheet 324 and 318, respectively. The permeate gas is withdrawn through the open ends of the hollow fiber lumens on the axial surface of the tubesheet 324. This flow arrangement ensures a substantially countercurrent flow of the feed gas with respect to the permeate gas. The cartridge 304 is further equipped with a flow-control orifice 327 that provides for introduction of a fraction of the nonpermeate gas as a sweep. The orifice 327 is preferably a replaceable orifice attached to the cap 320 by a thread or a similar detachable arrangement. The placement of the orifice 327 can be omitted from the embodiments that do not require the use of the sweep gas internal to the cartridge. Furthermore, the cartridge 304 shown in FIG. 3 can be converted from a cartridge that utilizes the sweep to a cartridge that does not utilize the sweep by sealing the gas passageway in the orifice 327 with a stopper.

In the gas purification/separation process or this invention the feed gas is introduced into the apparatus 301 through the feed port 308 that connects to the hollow gas transport conduit 311. The gas is transported through the filtration media of the filtration element 303 wherein the suspended matter is removed. The thus filtered gas is then transported through conduit 310 into the inner core member 315. The feed gas is channeled through openings 325 into the shell side of the hollow fiber membrane bundle 316 wherein the feed gas is brought into contact with the exterior of hollow fiber membranes. The feed gas stripped of undesirable gaseous impurities, such as water vapor, that were removed by permeation into the hollow fiber lumens is then transported through the gap 322 and openings 326 in the exterior cartridge shell and is collected as a product nonpermeate gas through the exit port 309. A fraction of the nonpermeate gas is directed through the orifice 327 into the hollow fiber lumens and is used as a sweep gas on the permeate side of the hollow fibers. The combined permeate/flow stream is removed from the apparatus as a waste gas through the port 319. The liquid removed by the filtration element 303 is collected at the bottom of the bowl or shell 305 and is removed through the liquid waste port 326 intermittently. The orifice 327 is an interchangeable flow-control orifice that is sized to allow a predetermined amount of nonpermeate gas to be used as a sweep. The amount of sweep gas in turn determines the level of product purity. The sweep gas flow rate is frequently 5% to about 30% of the net flow rate of the nonpermeate gas. The advantageous feature of the cartridge is that the same cartridge can be used to generate different purity products by simply changing the size of the orifice. The cartridge can be used for gas separation applications that do not require the use of sweep gas by simply blocking or eliminating the orifice 327.

The apparatus shown in FIG. 3 utilizes a hollow fiber membrane cartridge wherein the feed gas is introduced internal to the cartridge and the nonpermeate gas is withdrawn external to the cartridge.

In some embodiments, a particulate filter can be further incorporated into the apparatus of this invention downstream of the hollow fiber membrane cartridge (not shown) as a polishing filter.

Specific features of this invention are shown in one or more of the drawings for convenience only, as each feature may be combined with other features in accordance with the invention. Alternative embodiments will be recognized by those skilled in the art and are intended to be included within the scope of the claims.

What is claimed is:

1. A gas purification process comprising:
   a) passing a feed gas stream containing water vapor through at least one filtration element adapted to suspend matter from said feed gas stream passing therethrough to produce a filtered feed gas,
   b) contacting the filtered feed gas with a multiplicity of hollow fiber membranes contained in a cartridge, permeating a portion of the water vapor contained in the feed gas stream through the membranes, and
   c) recovering the main remaining nonpermeate dehydrated and filtered gas stream wherein said filtration element and said hollow fiber membrane cartridge are disposed around a common longitudinal axis and are enclosed in a common casing.

2. The gas purification process of claim 1 wherein said filtration element at least partially surrounds said membrane cartridge.

3. The gas purification process of claim 1 wherein said membrane cartridge at least partially surrounds said filtration element.

4. The gas purification process of claim 1 wherein said filtration element is positioned below said hollow fiber membrane cartridge.

5. The gas purification process of claim 1 wherein said membrane cartridge is encased with a nonpermeable film barrier except for a non-encased circumferential region adjacent to one end of said membrane cartridge.

6. The gas purification process of claim 1, wherein said process further includes, in step (c), utilizing a portion of a resultant nonpermeate dehydrated gas stream internally of the cartridge to provide a sweep gas to the permeate side of the hollow fiber membranes substantially countercurrent to the flow of the feed gas stream.

7. The gas purification process of claim 6 wherein the sweep gas flow rate is from 5% to about 30% of the net flow rate of the nonpermeate dehydrated and filtered gas.

8. The gas purification process of claim 6 wherein the sweep gas flow is controlled by an orifice that allows for a predetermined amount of the nonpermeated dehydrated gas to pass to the permeate side of the hollow fiber membrane.

9. The gas purification process of claim 8 wherein said orifice is removably attached to said cartridge.

10. The gas purification process according to claim 1 wherein the feed gas is comprised of compressed air.

11. The gas purification process of claim 1 wherein the feed gas stream is introduced to the exterior of the hollow fiber membranes at a first end of the hollow fiber membrane cartridge and the dehydrated nonpermeate gas is removed from the exterior of the hollow fiber membrane at a second end of the hollow fiber membrane cartridge.

12. The gas purification process of claim 1 further comprising a cyclone separator disposed in front of the filtration element.

13. The gas purification process of claim 1 wherein said filtration element and said hollow fiber membrane cartridge are placed in a sealed and removable manner inside said casing.

14. The gas purification process of claim 13 wherein said filtration element abuts the hollow fiber membrane cartridge.

15. The gas purification process of claim 14 wherein said filtration element is removably attached to said hollow fiber membrane cartridge.

16. The gas purification process of claim 1 wherein said filtration element is a coalescing filter.

17. The process of claim 1 wherein the packing density of the hollow fibers in said cartridge is varied along the axial length of the cartridge.

18. The process of claim 1 wherein in step (c) a portion of at least one additional gas contained in said feed gas is permeated through the membranes.

19. The process of claim 1 wherein said cartridge includes:
  a) an elongated tubular inner core member,
  b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
  c) two tubular tubesheets encapsulating both ends of said hollow fiber bundle in a fluid-tight arrangement with one end of the inner core member opening out of one of said tubesheets to permit the flow of gas in and out of said inner core member, and wherein at least one of said tubesheets is severed to permit flow of gas in and out of the hollow fiber lumens,
  d) a shell and at least one end closure surrounding said hollow fiber membrane bundle,
  e) a flow-control orifice that directs a predetermined amount of nonpermeate gas as a sweep into the permeate side of the hollow fiber membranes.

20. The process of claim 19 wherein said hollow fiber membranes are wound around said tubular core member.

21. The process of claim 1, further comprising draining permeated water vapor fluid from said casing.

22. gas purification process comprising:
  a) contacting a feed gas stream with a multiplicity of hollow fiber membranes contained in a cartridge,
  b) permeating a portion of water vapor contained in the feed gas stream through the membranes while simultaneously removing suspended matter contained in said feed gas, and
  c) recovering the main remaining nonpermeate dehydrated and filtered gas stream.

23. The gas purification process of claim 22 wherein said membrane cartridge is encased with a nonpermeable film barrier except for a non-encased circumferential region adjacent to one end of said membrane cartridge.

24. The gas purification process of claim 22, wherein said process further includes utilizing a portion of a resultant nonpermeate dehydrated gas stream internally of the cartridge to provide a sweep gas to the permeate side of the hollow fiber membranes substantially countercurrent to the flow of the feed gas stream.

25. The gas purification process of claim 24 wherein the sweep gas flow rate is from 5% to about 30% of the net flow rate of the nonpermeate dehydrated gas.

26. The gas purification process of claim 22 wherein the feed gas is comprised of compressed air.

27. The gas purification process of claim 22 wherein the feed gas stream is introduced to the exterior of the hollow fibers at a first end of the hollow fiber membrane cartridge and the dehydrated nonpermeate gas is removed from the exterior of the hollow fibers at a second end of the hollow fiber membrane cartridge.

28. The process of claim 22 wherein said hollow fiber membranes are wound around a central core member.

29. A gas purification apparatus comprising:
  a) a housing body defined by first and second essentially cylindrical shells connected in a sealed and removable manner in correspondence with their axial end portion to a head closure member interposed therebetween, said first and second shells defining a lower internal chamber and upper internal chamber within said housing, wherein said head closure member having formed therethrough a feed gas inlet port in a first end of said head closure member and an outlet port in a second end of said head closure member, and at least one gas transfer conduit in fluid communication with said upper and lower internal chambers,
  b) a gas filtration element adapted to separate suspended matter from incoming gas passing therethrough disposed in said lower chamber and,
  c) a hollow fiber membrane cartridge adapted to separate water vapor from incoming gas passing therethrough disposed in said upper chamber wherein said filtration element and said hollow fiber membrane cartridge are disposed around a common longitudinal axis within said housing body, said axis being essentially concentric to said housing body.

30. The apparatus of claim 29 wherein said cartridge comprises:
  a) an elongated tubular inner core member,
  b) a substantially cylindrical hollow fiber membrane bundle surrounding said inner core member constructed from the hollow fiber membranes having permeate and nonpermeate sides, said bundle being characterized as having a substantially countercurrent flow arrangement between the gas flow on said permeate side and the gas flow on said nonpermeate side,
  c) two tubular tubesheets encapsulating both ends of said hollow fiber bundle in a fluid-tight arrangement with one end of the inner core member opening out of one of said tubesheets to permit the flow of gas in and out of said inner core member and wherein at least one of said tubesheets is severed to permit an unobstructed flow of gas in and out of the hollow fiber lumens.

31. The apparatus of claim 30 wherein said cartridge further contains an orifice that allows for a predetermined amount of the nonpermeate gas to pass to the permeate side of the hollow fiber membranes as a sweep.

32. The apparatus of claim 30 wherein said membrane cartridge is encased with a nonpermeable film barrier essentially along the entire length of the multiplicity of hollow fiber membranes except for a non-encased circumferential region adjacent to one end of said membrane cartridge.

33. The apparatus of claim 30 wherein said hollow fiber membranes are wound around said tubular core member.

34. The apparatus of claim 29 wherein the feed gas stream is introduced to the exterior of the hollow fiber membranes at a first end of the hollow fiber membrane cartridge and the dehydrated nonpermeate gas is removed from the exterior of the hollow fiber membranes at a second end of the hollow fiber membrane cartridge.

* * * * *